(12) United States Patent
Wang et al.

(10) Patent No.: US 11,688,193 B2
(45) Date of Patent: Jun. 27, 2023

(54) INTERACTIVE STRUCTURE ANNOTATION WITH ARTIFICIAL INTELLIGENCE

(71) Applicant: International Business Machines Corporation, Armonk, NY (US)

(72) Inventors: Xin Ru Wang, San Jose, CA (US); Douglas Ronald Burdick, Scotts Valley, CA (US); Yunyao Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 17/097,015

(22) Filed: Nov. 13, 2020

(65) Prior Publication Data

US 2022/0156487 A1 May 19, 2022

(51) Int. Cl.
*G06V 30/412* (2022.01)
*G06F 18/23* (2023.01)

(52) U.S. Cl.
CPC ............ *G06V 30/412* (2022.01); *G06F 18/23* (2023.01)

(58) Field of Classification Search
CPC ........... G06V 30/40–43; G06V 30/412; G06K 9/6218; G06F 18/23
See application file for complete search history.

(56) References Cited

U.S. PATENT DOCUMENTS

| | | | |
|---|---|---|---|
| 7,251,349 B2 | 7/2007 | Najman et al. | |
| 8,914,419 B2 | 12/2014 | Gerard et al. | |
| 9,268,999 B2 | 2/2016 | Xu et al. | |
| 9,495,347 B2 | 11/2016 | Stadermann et al. | |
| 10,803,399 B1 * | 10/2020 | Cohen | G06F 16/93 |
| 2004/0193520 A1 | 9/2004 | LaComb et al. | |
| 2019/0278837 A1 | 9/2019 | Agrawal et al. | |
| 2019/0332662 A1 | 10/2019 | Middendorf et al. | |
| 2020/0042785 A1 | 2/2020 | Burdick et al. | |
| 2022/0108065 A1 * | 4/2022 | Eshghi | G06F 16/164 |

FOREIGN PATENT DOCUMENTS

| | | |
|---|---|---|
| EP | 2374067 | 1/2009 |
| JP | 02252078 | 3/1989 |

\* cited by examiner

*Primary Examiner* — Casey L Kretzer
(74) *Attorney, Agent, or Firm* — Lieberman & Brandsdorfer, LLC

(57) ABSTRACT

A computer system, product, and method are provided to utilize machine learning to facilitate document processing. A document collection is introduced to an artificial neural network (ANN), which subjects the document collection to table region identification within discretized contiguous areas. The documents are assigned to one or more clusters responsive to the leveraged ANN. Documents are selectively evaluated from the clusters, and one or more label corrections are applied to the ANN. The ANN generates an updated document collection incorporating the applied one or more label corrections.

20 Claims, 7 Drawing Sheets

INTERACTIVE STRUCTURE ANNOTATION WITH ARTIFICIAL INTELLIGENCE

BACKGROUND

The present embodiments relate to information technology, and in certain exemplary embodiments improvements to a system, computer program product, and method employing artificial intelligence with portable document format (PDF) document processing.

A table is a data structure that organizes information into rows and columns, and formation of cells there between. Tables are employed in some venues to display data in a structured format. For example, some venues use tables to display large amounts of data in a comprehensible format. Portable document format (PDF) is a file format designed to present documents consistently across multiple devices and platforms. The PDF file can store a wide variety of data, including formatted text, vector graphics, and raster images. It also contains page layout information, which defines a location of each item on the page(s).

Automatic identification, separation, and parsing of tables in PDF documents are commonly important tasks in an enterprise content collection pipeline. Valuable high-precision data are often publicized in tables, such as those provided on the pages of financial and technical reports, for example. The challenge of table recognition, however, results, in part, from the diversity of such tables and documents. For example, tables can be small or large, with or without borders and separating lines, with mixed alignment (left, right, and center), with cells containing paragraphs, with multi-column or multi-row subtitles, with indentation and hierarchy, with headnotes and footnotes, etc. Additionally, there can be multiple tables on a page, co-aligned or not, with text in between the tables or not, and sometimes embedded inside a multi-column text layout that itself looks like a table. Further, table appearance differs greatly across numerous styles, subject matters, publisher regulations, source institutions, localities and time periods, and typesetting tools. However, existing document processing techniques do not include a table-specific machine readable markup in the PDF format; any such markup is generally omitted when a PDF file is generated.

SUMMARY

The embodiments include a system, a computer program product, and a method for application of artificial intelligence directed at document structure, including in particular embodiments in relation to repair or annotation of one or more tables or one or more table components that are the subject of incorrect extraction.

In one aspect, a computer system is provided with a processing unit operatively coupled to memory, and an artificial intelligence (AI) platform operatively coupled to the processing unit. The AI platform includes machine learning tools in the form of a document manager, a cluster manager, and an evaluator. The document manager is configured to cause an artificial neural network (ANN) to subject a document collection to table region identification within one or more discretized contiguous areas. The cluster manager is configured to subject the document collection to clustering. The ANN is leveraged to extract one or more structures and location of the structures in the document collection. The documents are assigned to one or more clusters responsive to the leveraged ANN. Each cluster includes one or more documents having a content characteristic. The evaluator is configured to selectively evaluate a selection of the documents from the one or more clusters, and to apply one or more label corrections to the ANN. The ANN generates an updated document collection incorporating the applied one or more label corrections.

In another aspect, a computer program product is provided to utilize machine learning to facilitate document processing. The computer program product includes a computer readable storage medium having program code embodied therewith. Program code, which is executable by a processor, is provided. The program code is configured to cause an artificial neural network (ANN) to subject the document collection to table region identification within one or more discretized contiguous areas. The program code is configured to subject the document collection to clustering, which includes leveraging the ANN to extract one or more structures and location of the structures in the document collection, and assignment of the documents to one or more clusters responsive to the leveraged ANN. Each cluster includes one or more documents having a content characteristic. The program code is further configured to selectively evaluate a selection of documents from the one or more clusters, and to apply one or more label corrections to the ANN. The ANN generates an updated document collection incorporating the applied one or more label corrections.

In yet another aspect, a computer-implemented method is provided to utilize machine learning to facilitate document processing. An artificial neural network (ANN) subjects a document collection to table region identification within one or more discretized contiguous areas, followed by subjecting the document collection to clustering. The process of clustering leverages the ANN to extract one or more structures and location of the one or more structures in the document collection. The documents are assigned to one or more clusters responsive to the leveraged ANN, with each cluster having one or more documents having a content characteristic. A selection of the documents is selectively evaluated from the one or clusters, and one or more label corrections are applied to the ANN. The ANN generates an updated document collection incorporating the applied one or more label corrections.

These and other features and advantages will become apparent from the following detailed description of the exemplary embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
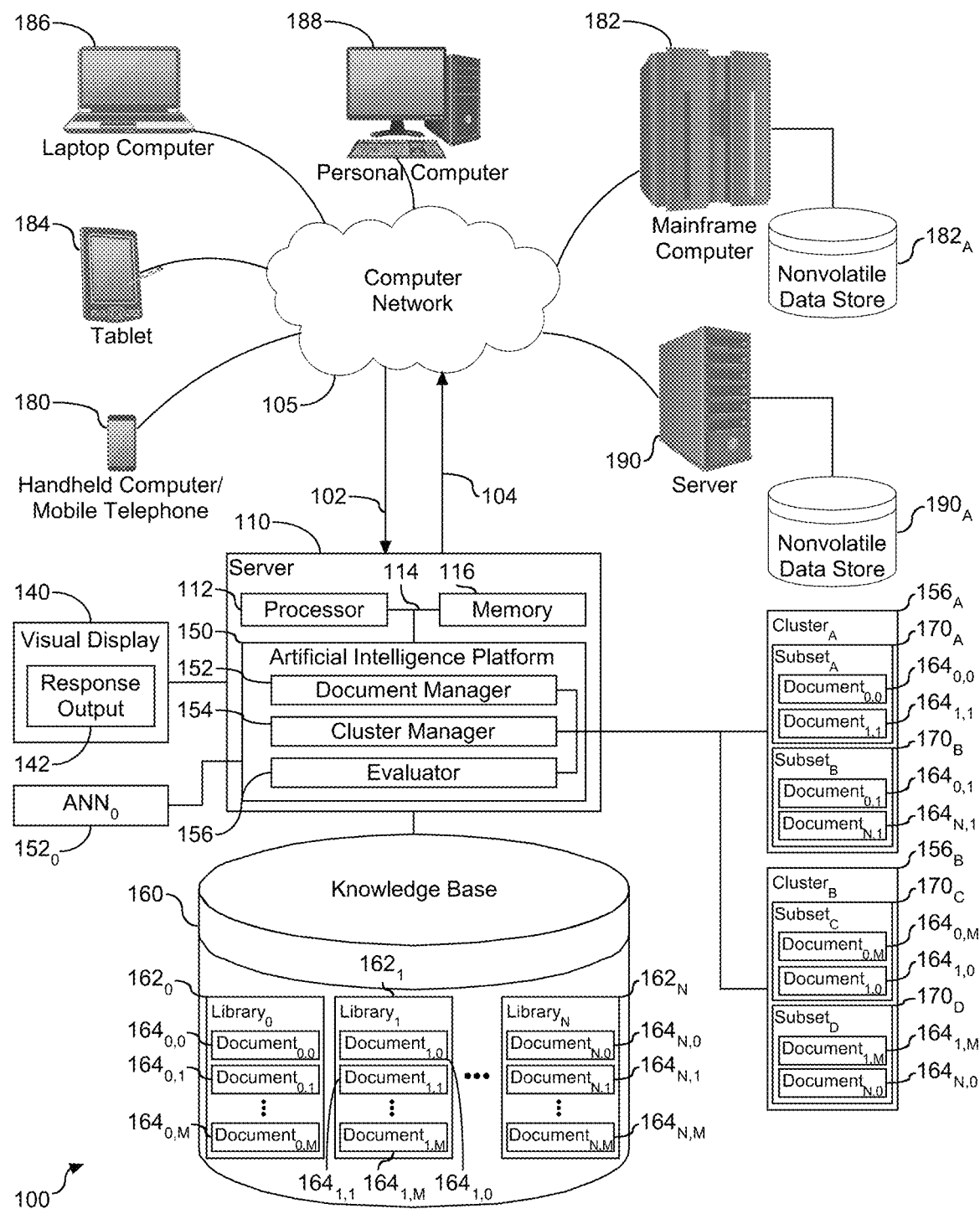
FIG. 1 depicts a schematic diagram of a computer system to support and enable supervised learning in connection with PDF documents and identification and extraction of tables within the documents.

It will be readily understood that the components of the present embodiments, as generally described and illustrated in the Figures herein, may be arranged and designed in a wide variety of different configurations. Thus, the following detailed description of the embodiments of the apparatus, the system, the method, and the computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. It should be understood that the various embodiments may be combined with one another and that any one embodiment may be used to modify another embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a dataset to solve problems and provide relevant recommendations. For example, in the field of artificial intelligent computer systems, natural language systems (such as the IBM Watson® artificially intelligent computer system or other natural language interrogatory answering systems) process natural language based on system-acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. AI refers to the intelligence when machines, based on information, are able to make decisions, which maximizes the chance of success in a given topic. More specifically, AI is able to learn from a dataset to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based upon an express or inherent relationship within the structure. Adequate datasets are relied upon for building those structures.

ML techniques are required to improve accuracy of predictive models. Depending on the nature of the business problem being addressed, there are different approaches based on the type and volume of the data. For example, Unsupervised Learning is used when the problem requires a large amount of unlabeled data and employs algorithms to classify the data based on the patterns of clusters it finds. Unsupervised Learning conducts an iterative process, analyzing data without human intervention. In another example, Supervised Learning typically begins with an established set of data and a certain understanding of how that data is classified. Supervised Learning is intended to find patterns in data that can be applied to an analytics process. This data has labeled features that define the meaning of data. Reinforcement Learning is another example and is a behavioral learning model with an algorithm to receive feedback from data analysis to guide a user to the best outcome.

As described herein, an embodiment includes techniques for recognition of elements in portable document format (PDF) documents. It is understood in the art that PDF document are an example of fixed-format structured documents in which the content within the documents are specified based on its properties and location on the page and not on the basis of a document structure. The PDF document is designed to present documents the same way regardless of the platform and software. Page boundaries of the PDF document are referred to as a media box and a crop box. The media box specifies the height and width of the page, and the crop box, which is optional, defines the region to which the page content is clipped. Elements outside of the boundary of the crop box will not be visible. In an exemplary embodiment, the crop box is used for display and printing.

A contiguous area of a PDF document is referred to herein as a canvas, which may be a single document page, or multiple document pages stitched together. Each object on a canvas can be a content object or a marker object. The content object can include, for example, text, such as a word or number, an image, such as a logo or derived content, such as a chart. In an embodiment, each object has an associated feature vector that includes the coordinates of its bounding box, as well as selected appearance and content features, such as, for example, font type, font size, font color, bold, italic, numeric, special character, graphical line, etc. For an image, the PDF document has information on the coordination location, e.g. x and y coordinates, of an image Tables are popular tools for data representation, and are commonly found in PDF documents. Examples of such documents containing tables include, but are not limited to, invoices, financial reports, contracts, government reports, scientific papers, and loan applications. Challenges arise with respect to extracting, or in an embodiment accurately extracting, tables from PDF documents, with the challenges directed at repair or annotation of tables that are improperly extracted or contain errors associated with the extraction. Table borders and structures are tedious and time-consuming to annotate manually.

Tables are not encoded in the PDF document. Automatic identification, separation, and parsing of tables in PDF documents are commonly important tasks in an enterprise content collection pipeline. For example, valuable high-precision data are often publicized in tables, such as those provided on the pages of financial and technical reports. The challenge of table recognition, however, results, in part, from the diversity of such tables and documents. For example, tables can be small or large, with or without borders and separating lines, with mixed alignment (left, right, and center), with cells containing paragraphs, with multi-column or multi-row subtitles, with indentation and hierarchy, with headnotes and footnotes, etc. Additionally, there can be multiple tables on a page, co-aligned or not, with text in between the tables or not, and sometimes embedded inside a multi-column text layout that itself looks like a table. Further, table appearance differs greatly across numerous styles, subject matters, publisher regulations, source institutions, localities and time periods, and typesetting tools. However, existing document processing techniques do not include repair or annotation of tables extracted incorrectly. Accordingly, as shown and described herein, a system, computer-program product, and computer-implemented method are provided to employ ML and ML techniques to identify and apply document label corrections.

According to exemplary embodiments described in further detail below, a document evaluation technique, and more specifically, a document clustering technique is provided to employ ML techniques directed at repair and annotation of incorrectly extracted tables from a PDF formatted document or collection of documents.

Referring to FIG. 1, a schematic diagram of a computer system (100) is provided with tools for supervised learning, including, for example, in connection with PDF documents and identification and extraction of tables within the documents. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support supervised learning. More specifically, the AI platform (150) is configured with one or more artificial neural networks (ANN) and associated tools to manage document clustering and inter and intra cluster document processing. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input, such as actions or documents, across the network (105) from one or more of the plurality of computing devices (180), (182), (184), (186), (188), and (190). Furthermore, and as shown herein, the AI platform (150) is operatively coupled to a knowledge base (160) populated with libraries and documents therein. Shown herein by way of example, the knowledge base is shown with library$_0$ (162$_0$), library$_1$ (162$_1$), . . . , library$_N$ (162$_N$). Each library includes one or more documents. As shown herein, library$_0$ (162$_0$) is shown with document$_{0,0}$ (164$_{0,0}$), document$_{0,1}$ (164$_{0,1}$), and document$_{0,M}$ (164$_{0,M}$), library$_1$ (162$_1$) is shown with document$_{1,0}$ (164$_{1,0}$), document$_{1,1}$ (164$_{1,1}$), and document$_{1,M}$ (164$_{1,M}$), and library$_N$ (162$_N$) is shown with document$_{N,0}$ (164$_{N,0}$), document$_{N,1}$ (164$_{N,1}$), and document$_{N,M}$ (164$_{N,M}$). It should be understood that the knowledge base (160) may include additional libraries. It should further be understood that the knowledge base (160) may be joined or divided into further knowledge bases. The knowledge base (160) and associated libraries and documents shown and described herein are for descriptive purposes.

The AI platform (150) is shown herein with a document manager (152), a cluster manager (154), and an evaluator (156). As shown herein, the document manager (152) is operatively coupled to an artificial neural network (ANN), referred to herein as a first ANN, ANN$_0$, (152$_0$). The document manager (152) interfaces with the first ANN (152$_0$) by introducing one or more collection of documents from the knowledge base (160), or across the network connection (102) to ANN$_0$ (152$_0$). As shown and described herein, the documents introduced to ANN$_0$ (152$_0$) are in PDF format, also referred to herein as PDF documents. ANN$_0$ (152$_0$) processes the introduced documents to identify table regions within one or more discretized contiguous areas within each of the introduced documents. For each introduced document, the ANN$_0$ (152$_0$) detects any tables boxes and cell boxes. In an exemplary embodiment, ANN$_0$ (152$_0$) may include separate ANNs (not shown), one ANN to detect table boxes and a second ANN to detect cell boxes. Output from the ANN is in the form of preliminary identified characteristics, e.g. character(s) with format and position information, and an identifier, e.g. confidence value, associated with the accuracy of the identified characteristics. The identifier associated with or assigned to a document is based on weights assigned by the ANN, e.g. ANN$_0$ (152$_0$), which is derived from the visual or contextual content.

ANN$_0$ (152$_0$), or in an exemplary embodiment the separate ANNs, is leveraged by an operatively coupled cluster manager (154) to subject the document collection associated with the table boxes and cell boxes identification to clustering. In an exemplary embodiment, the clustering or cluster assignment is based on content in the form of visual and/or textual content. Through the leveraging, content and content characteristic(s) within the document(s) is identified and/or extracted, including one or more structures and their locations within the associated document. The cluster manager (154) selectively assigns the documents introduced to the document collection to a cluster in response to output from the ANN, e.g. ANN$_0$ (152$_0$). For example, in an embodiment, documents with a similar template are assigned to the same cluster. In an exemplary embodiment, the documents are assigned to one cluster from a selection of at least two clusters. Documents are selectively assigned to a cluster based on one or more common characteristics associated with common table features or characteristics. In an exemplary embodiment, at least two documents in each cluster have at least one table or one table shared by the documents that is the same or has similar visual cues for delineation from proximal document content.

As shown, the evaluator (156) is operatively coupled to the cluster manager (154). The evaluator (156) functions to selectively evaluate a selection of documents from at least one of the at least two clusters. The evaluator (156) identifies a first subset of two or more documents in a first cluster and a second subset of two or more documents in a second cluster, with the first subset being a selection of documents having a first specific identifier or an identifier within a first range and the second subset being a selection of documents having a second specific identifier or an identifier within a second range different from the first range. In an exemplary embodiment, the first range is an identifier or range of identifiers corresponding to high confidence of detections and similarity of table type, and the second range is an identifier or range of identifiers corresponding to low confidence of detects and similarity of table type.

As shown herein by way of example, a set of clusters are shown herein operatively coupled to the cluster manager (154), including a first cluster, $cluster_A$ ($156_A$), and a second cluster, $cluster_B$ ($156_B$). Each of the clusters may include a plurality of documents as represented within one or more of the libraries and positioned within the assigned cluster with respect to their corresponding identifier. In the example shown herein, $cluster_A$ ($156_A$) is shown with $document_{0,0}$ ($164_{0,0}$), $document_{1,1}$ ($164_{1,1}$), $document_{N,1}$ ($164_{N,1}$), and $document_{0,1}$ ($164_{0,1}$), and $cluster_B$ ($156_B$) is shown with $document_{0,M}$ ($164_{0,M}$), $document_{1,0}$ ($164_{1,0}$), $document_{1,M}$ ($164_{1,M}$), and $document_{N,0}$ ($164_{N,0}$). Two subsets are shown formed within the first cluster, $cluster_A$ ($156_A$), including a first subset, $subset_A$ ($170_A$), and a second subset, $subset_B$ ($170_B$). Similarly, two subsets are shown formed within the second cluster, $cluster_B$ ($156_B$), including a third subset, $subset_C$ ($170_C$), and a fourth subset, $subset_D$ ($170_D$). The quantity of clusters and corresponding subsets are for descriptive purposes and should not be considered limiting. In this example, two documents, shown herein as $document_{0,0}$ ($164_{0,0}$) and $document_{1,1}$ ($164_{1,1}$), in the first cluster, $cluster_A$ ($156_A$), are identified as having a confidence value that is high, e.g. strong, and are assigned to the first subset, $subset_A$ ($170_A$). Similarly, two documents, shown herein as $document_{N,1}$ ($164_{N,1}$) and $document_{0,1}$ ($164_{0,1}$), in the first cluster, $cluster_A$ ($156_A$), are identified as having a confidence value that is low, e.g. weak, and are assigned to the second subset, $subset_B$ ($170_B$). Similarly, two documents shown herein as $document_{0,M}$ ($164_{0,M}$) and $document_{1,0}$ ($164_{1,0}$), in the second cluster, $cluster_B$ ($156_B$), are identified as having a confidence value that is high, e.g. strong, and are assigned to the third subset, $subset_C$ ($170_C$). Similarly, two documents, shown herein as $document_{1,M}$ ($164_{1,M}$) and $document_{N,0}$ ($164_{N,0}$), in the second cluster, $cluster_B$ ($156_B$), are identified as having a confidence value that is low, e.g. weak, and are assigned to the fourth subset, $subset_D$ ($170_D$). The quantity of documents assigned to the subsets shown herein is for exemplary purposes and should not be considered limiting. In an embodiment, each subset may have a larger quantity of assigned documents.

A document with an assigned identifier having a high confidence value of the accuracy of the identified characteristics is considered to require low effort with respect to application of corrections. Similarly, a document with an assigned identifier having a low confidence value of the accuracy of the identified characteristics is considered to require a high or higher effort with respect to application of corrections. The evaluator (156) selectively evaluates a selection of documents from the formed clusters. For documents selected in the first subset ($170_A$), the evaluation may be directed at confirming accuracy of the tables in the document, and for documents in the second subset ($170_B$), the evaluation may be directed at correction of tables. The document evaluation in each of the subsets is an interactive process. In an exemplary embodiment, the document evaluation requires the use of a subject matter expert (SME) to make any necessary corrections, such as adjustments, deletions, or additions to table bounding. In an exemplary embodiment, the corrections are referred as label corrections. Similarly, in an exemplary embodiment, document evaluation within a single cluster, e.g. $cluster_A$ ($156_A$) is referred to herein as intra-cluster evaluation or homogeneous, and document evaluation across two or more clusters, e.g. $cluster_A$ ($156_A$) and $cluster_B$ ($156_B$) is referred to herein as inter-cluster evaluation or heterogeneous.

Regardless of whether the document evaluation is homogeneous or heterogeneous, the corrections are applied to the ANN, e.g. $ANN_0$ ($152_0$), which re-generates an updated document collection that incorporates the applied label corrections. See FIG. 3B, step (330) for a detailed description of application of the correction(s). The document update may be applied to all of the documents in the cluster, or in an exemplary embodiment may be applied to documents within a select subset. In an exemplary embodiment, document evaluation is heterogeneous, e.g. inter-cluster, with a selection of documents being from both the first and second subsets in each cluster, to build confidence in accuracy of label extraction and correction. The document manager (152) interfaces with the ANN, e.g. $ANN_0$ ($152_0$), to dynamically produce a structure within one or more documents, with the produced structure incorporating the table boundary update, intelligently split one or more cells along a text line and cell bounding box of a neighboring cell, and/or dynamically apply a character correction to one or more similar characters. By way of example, the ANN produces response output in the form of an updated document or document collection incorporating the label corrections and corresponding table, cell, and/or character updates. In an embodiment, the produced response output (142) may be presented on an operatively coupled visual display (140). For example, when the border is fixed in the document evaluation, the ANN re-generates the structure using previously detected cell locations. In another example, as table rows and columns are separated by one or more straight divisions, all characters in the same vertical or horizontal line can be moved at once. With respect to character correction, as text is directly edited, the document manager (152) leverages natural language processing (NLP) to identify characters. For example, an uppercase letter may be identified through NLP to identify a split within text, and a lowercase letter may identify that the text should not be split. Similarly, character correction may be applied in the same document, e.g. intra-document, or across two or more documents in the same cluster, e.g. inter-document.

Following application of one or more label corrections to the ANN by the document manager (152), the cluster manager (154) may subject the document collection to a re-clustering and further document processing by the evaluator (156). Any re-clustering of the document collection also produces new output from the ANN in the form of identified characteristics, e.g. character(s) with format and position information, and a new or revised identifier, e.g. confidence value, associated with the accuracy of the identified characteristics. Any revised cluster assignments from the re-clustering and any new or revised identifier may affect the order in which the evaluator (156) selectively evaluates a selection of the document from the formed or revised cluster assignments. For example, in an embodiment, documents previously assigned a high confidence identifier during an initial extraction and clustering process may now have an identifier corresponding with a low confidence identifier. In an exemplary embodiment, document evaluation responsive to re-clustering may prioritize document evaluation based on their initial confidence identifier assignment or based on their revised confidence identifier assignment.

The AI platform (150) is shown herein with tools to support and enable supervised learning pertaining to a PDF document with use of an ANN. The AI platform (150) tools are shown herein as a document manager (152), a cluster manager (154), and an evaluator (156) as described in detail in FIG. 1.

In some illustrative embodiments, server (110) may be the IBM Watson® system available from International Business Machines Corporation of Armonk, N.Y., which is augmented with the mechanisms of the illustrative embodiments described hereafter. The document manager (152), cluster manager (154), and evaluator (156) hereinafter referred to collectively as AI tools, are shown as being embodied in or integrated within the AI platform (150) of the server (110). In an embodiment, the AI tools may be implemented in a separate computing system (e.g., server 190) that is connected across network (105) to the server (110). Wherever embodied, the AI tools function to support supervised learning pertaining to a PDF document with use of an ANN directed at discretized contiguous areas of the PDF document(s). The AI tools function to automatically provide label corrections to documents with the collection to reduce required SME labelling effort by leveraging correction in one or more cells across multiple related rows and columns.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store (182a). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
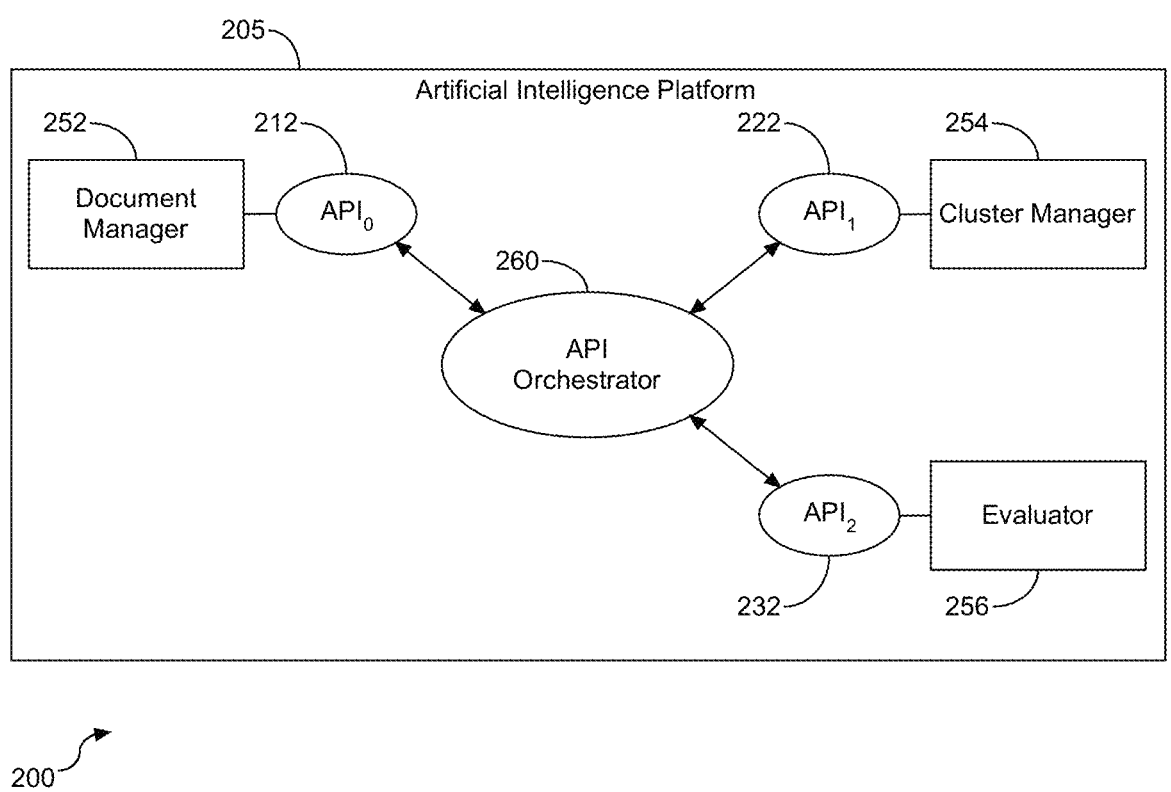
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools are embedded within the artificial intelligence platform (205), with the tools including a document manager (252) associated with $API_0$ (212), a cluster manager (254) associated with $API_1$ (222), and an evaluator (256) associated with $API_2$ (232). Each of the APIs may be implemented in one or more languages and interface specifications.

As shown, $API_0$ (212) is configured to support and enable the functionality represented by the document manager (252). $API_0$ (212) provides functional support to introduce the document collection to the ANN, which subjects the document collection to table region identification, and dynamic production of a structure responsive to a table boundary update, including intelligent split of one or more cells along a text line and cell bounding box of a neighboring cell, and character correction. $API_1$ (222) provides functional support to subject the document collection to clustering; and $API_2$ (232) provides functional support to selectively evaluate a selection of documents on an intra-cluster and/or inter-cluster basis. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. In another embodiment, the functionality of the separate APIs may be further divided into additional APIs. As such, the configuration of the APIs shown herein should not be considered limiting. Accordingly, as shown herein, the functionality of the tools may be embodied or supported by their respective APIs.

Figure 3A:
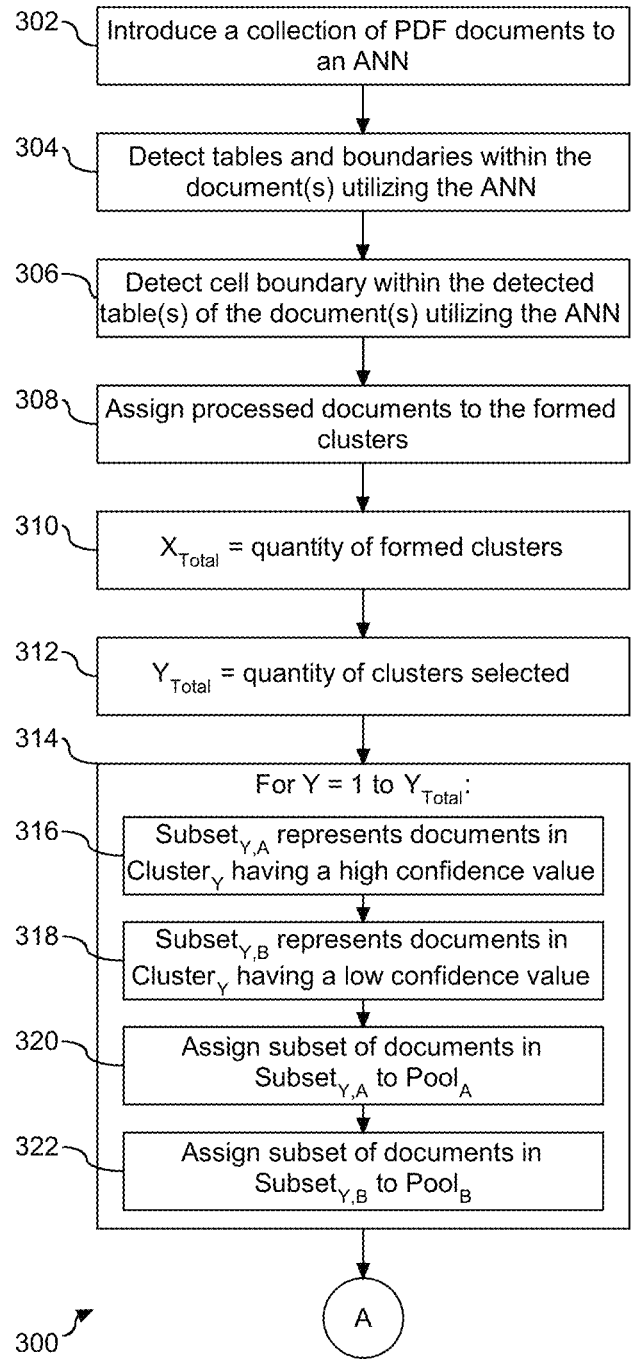
FIGS. 3A and 3B depict a flow chart illustrating an embodiment of a process for application of supervised learning pertaining to a PDF document collection with use of an ANN directed at discretized contiguous areas of the PDF document(s).
Figure 3B:
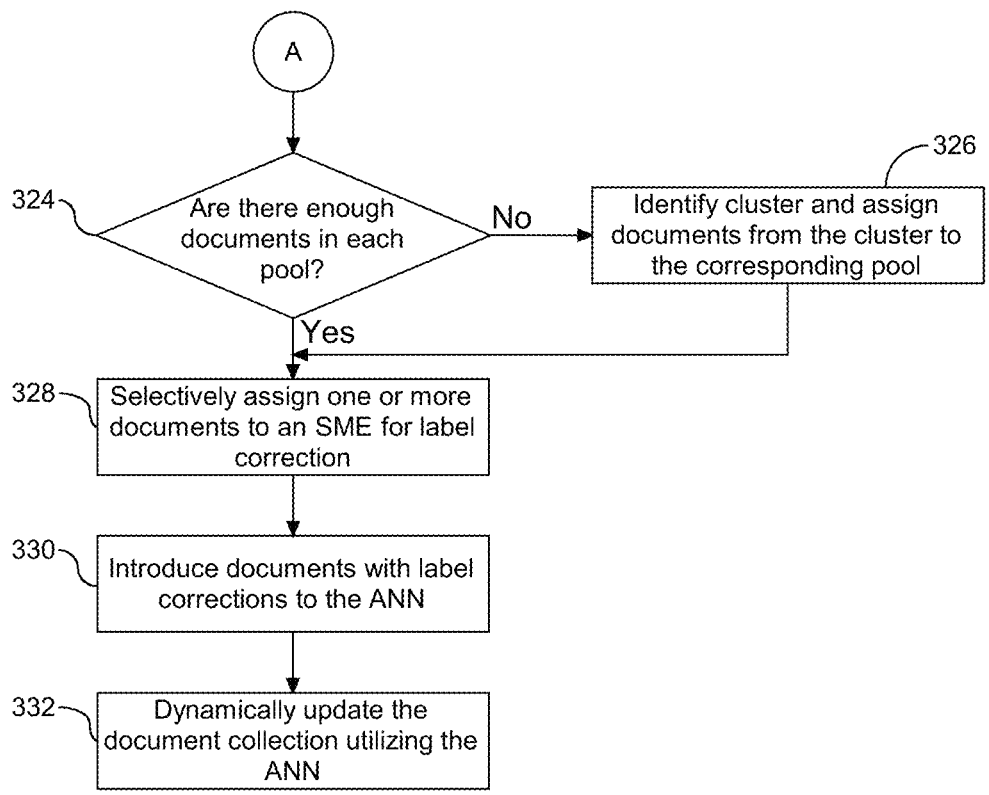

Referring to FIGS. 3A and 3B, a flow chart (300) is provided illustrating an embodiment of a process for application of supervised learning pertaining to a PDF document collection with use of an ANN directed at discretized contiguous areas of the PDF document(s). A collection of PDF documents is introduced to an ANN configured to detect structure borders and extract locations of corresponding tables in each document in the collection (302). The detected structure borders include visual and textual content and cell structure associated with the table. In an exemplary embodiment, the ANN may include separate ANNs (not shown), a first ANN to detect table boxes and a second ANN to detect cell boxes. Output from the ANN(s) is in the form of preliminary identified characteristics, e.g. character(s) with format and position information, and an identifier, e.g. confidence value, associated with the accuracy of the identified characteristics. The identifier associated with or assigned to a document is based on weights assigned by the first ANN(s), which is derived from the visual or contextual content. The ANN, or in an exemplary embodiment the first ANN, detects tables and boundaries of the tables within the document(s), and returns an identified table with border and structure together with a confidence value for each detected table as output (304). Similarly, the ANN, or in an exemplary embodiment the second ANN, detects cell boundary within the detected table(s) of the document(s), and returns output in the form of identified cell boundaries and corresponding confidence values for each identified cell (306).

Accordingly, the initial aspect of the PDF document collection processing is directed at preliminary identification of tables and cells within the document(s) together with corresponding confidence identifiers reflecting strength of the identification.

Following the table and cell structure identification(s), the document collection is subject to clustering to separate documents into document types. In one embodiment, at least two clusters are formed, each cluster corresponding to a document type based on visual and/or textual content, and the processed documents are assigned to one of the formed clusters (308). In an exemplary embodiment, feature weights from visual and textual content are leveraged to designate or assign a type to the document. At least two documents in each formed cluster have at least one table that utilizes similar visual cures for delineation from proximal document content. In an exemplary embodiment, the assigned document weights are leveraged for document cluster, e.g. document assignment to a cluster. Accordingly, each cluster includes a representation of one or more documents with tables which utilize similar visual cues for their delineation from surrounding document content, and have similar textual content.

A cluster representation variable, $X_{Total}$, is assigned the quantity of formed clusters (310). The documents are selectively reviewed by an SME for label accuracy and corresponding label correction, and dynamic application of the corrections to non-selected documents within the cluster, and in an embodiment within the collection, as described below. The document and corresponding label processing may take place on an inter-cluster basis or an intra-cluster basis. For inter-cluster processing, the variable $Y_{Total}$ identifies the quantity of clusters selected for the document and label processing (312). In the event the processing is intra-cluster, the variable) $Y_{Total}$ is assigned to the integer one, and the corresponding cluster is identified. Following step (312), for each document in the clusters that are the subject of the document processing (314), the subset$_{Y,A}$ represents documents in cluster$_s$ having a high confidence value (316), and the subset$_{Y,B}$ represents documents in cluster$_Y$ having a low confidence value (318). In an exemplary embodiment, the high confidence value may include a range of corresponding values, and similarly, the low confidence value may include a range of corresponding values. Accordingly, the clustering process includes further segregation of documents in each of the clusters, with the segregation based on corresponding document confidence values.

A selection of documents in each of the defined subsets, shown in FIG. 1 by way of example as subset$_A$ ($170_A$) and subset$_B$ ($170_B$), are subject to labeling. Whether the labeling takes place on an intra-cluster basis or an inter-cluster basis, the goal is to select a mixture of high confidence and low confidence documents, and with respect to inter-cluster processing to select heterogeneous documents for evaluation. In an exemplary embodiment, the mixed selection of documents for processing builds confidence in accuracy of the table and cell extraction and identification. As shown in FIG. 3A, for each cluster that is part of the selective document processing, e.g. from Y=1 to $Y_{Total}$, a subset of documents in subset$_{Y,A}$ are assigned to pool$_A$ (320) and a subset of documents in subset$_{Y,B}$ are assigned to pool$_B$ (322). The recommendation process is dynamic. If a certain cluster of documents requires an unexpected quantity of corrections, more documents may be added to the corresponding recommendation pool, e.g. pool$_A$ or pool$_B$. This is reflected at step (324) where an assessment is conducted to determine if there are enough documents in each of the corresponding recommendation pools. A negative response to the determination is followed by identification of the corresponding cluster(s) and dynamic assignment of documents from the cluster(s) to the corresponding pool(s) (326). Following step (326) or a positive response to the determination at step (324), one or more documents in each of the pools, e.g. pool$_A$ and pool$_B$, are selectively assigned to a subject matter expert (SME) for label correction (328). In an exemplary embodiment, the label correction is directed to tables and cells within the corresponding document(s). Accordingly, only a selection or a subset of documents in each pool is presented to the SME for correction, with the remainder subject to dynamic corresponding processing via the ANN.

Following step (328), the document label correction(s) are applied to the ANN. The documents in each corresponding cluster, or in an exemplary embodiment the document collection, are introduced to the ANN for identification of table regions and cells therein (330). This introduction to the ANN incorporates and applies the label corrections to the document collection. The application of the label corrections and generation of the updated document collection includes dynamically producing structure given a table boundary update, intelligently splitting one or more cells along a text line and cell bounding box of a neighboring cell, and/or dynamically applying a character correction to one or more similar characters (332). The application of the label corrections to the ANN and re-introduction of the document collection enables the ANN to learn from the label corrections and to dynamically apply the label corrections to the document collection. In an exemplary embodiment, the process returns to step (304) for continued document collection processing. In an embodiment, a criterion is applied for the continued document processing or the conclusion of the document processing. Accordingly, as shown herein, the document selection is subject to clustering responsive to the ANN, together with a heterogeneous identification and selection of documents for dynamic update of the document collection.

Aspects of the supervised learning are shown and described herein with the tools and APIs shown in FIGS. 1 and 2, respectively, and the processes shown in FIGS. 3A and 3B. Aspects of the functional tools (152), (154), and (156) and their associated functionality may be embodied in a computer system/server in a single location, or in an embodiment, may be configured in a cloud-based system sharing computing resources. With references to FIG. 4, a block diagram (400) is provided illustrating an example of a computer system/server (402), hereinafter referred to as a host (402) in communication with a cloud-based support system, to implement the processes described above with respect to FIGS. 3A and 3B. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments (410) where tasks are performed by remote processing devices that are linked through a communications network. In a distributed cloud computing environment, program modules may be located in both local and remote computer system storage media including memory storage devices.

Figure 4:
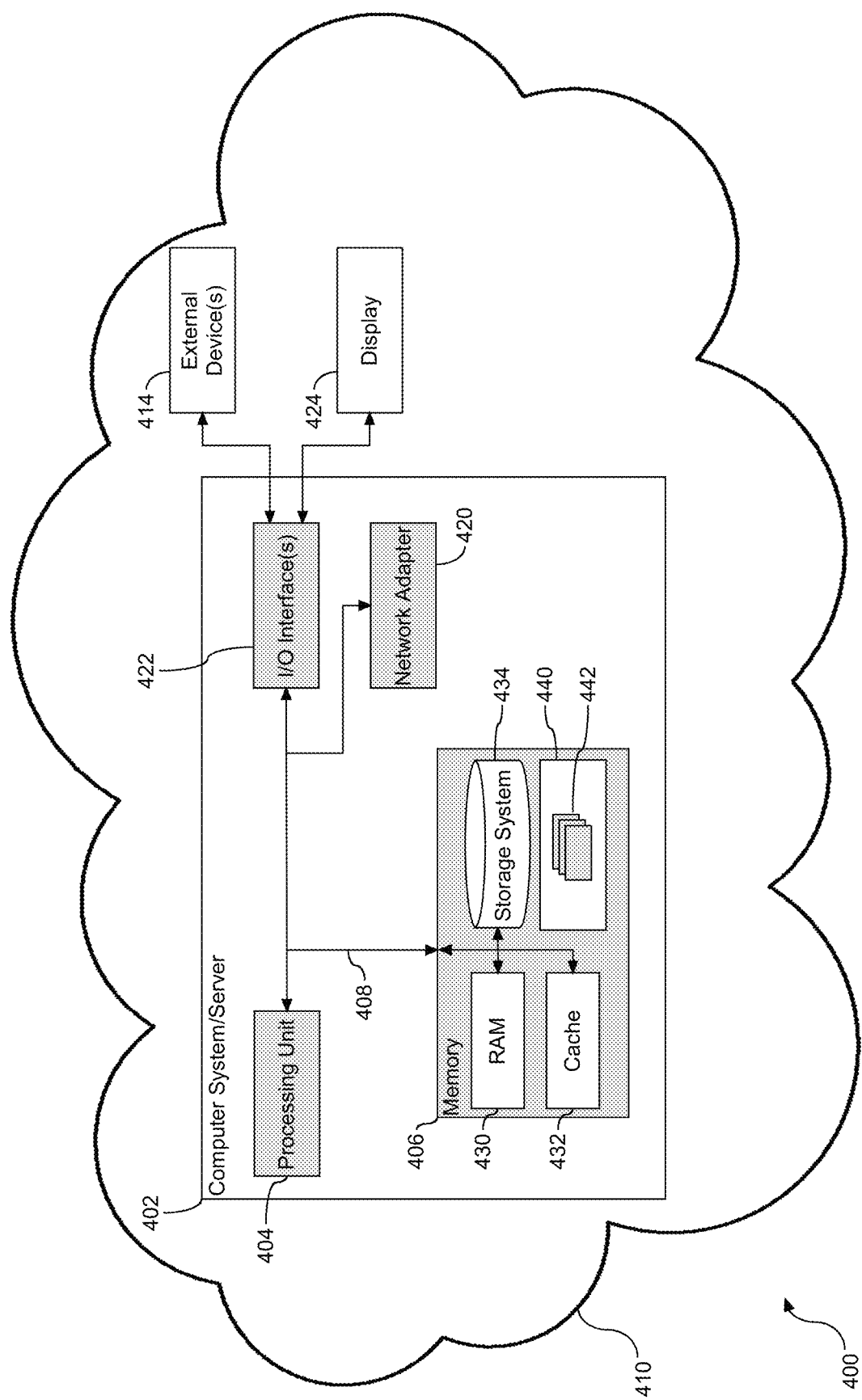
FIG. 4 depicts a block diagram illustrating an example of a computer system/server of a cloud based support system, to implement the system and processes described above with respect to FIGS. 1-3B.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processing unit (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to support and enable supervised learning for PDF document processing directed at identification of embedded tables and cells. For example, the set of program modules (442) may include the tools (152), (154), and (156) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In an embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

In an embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
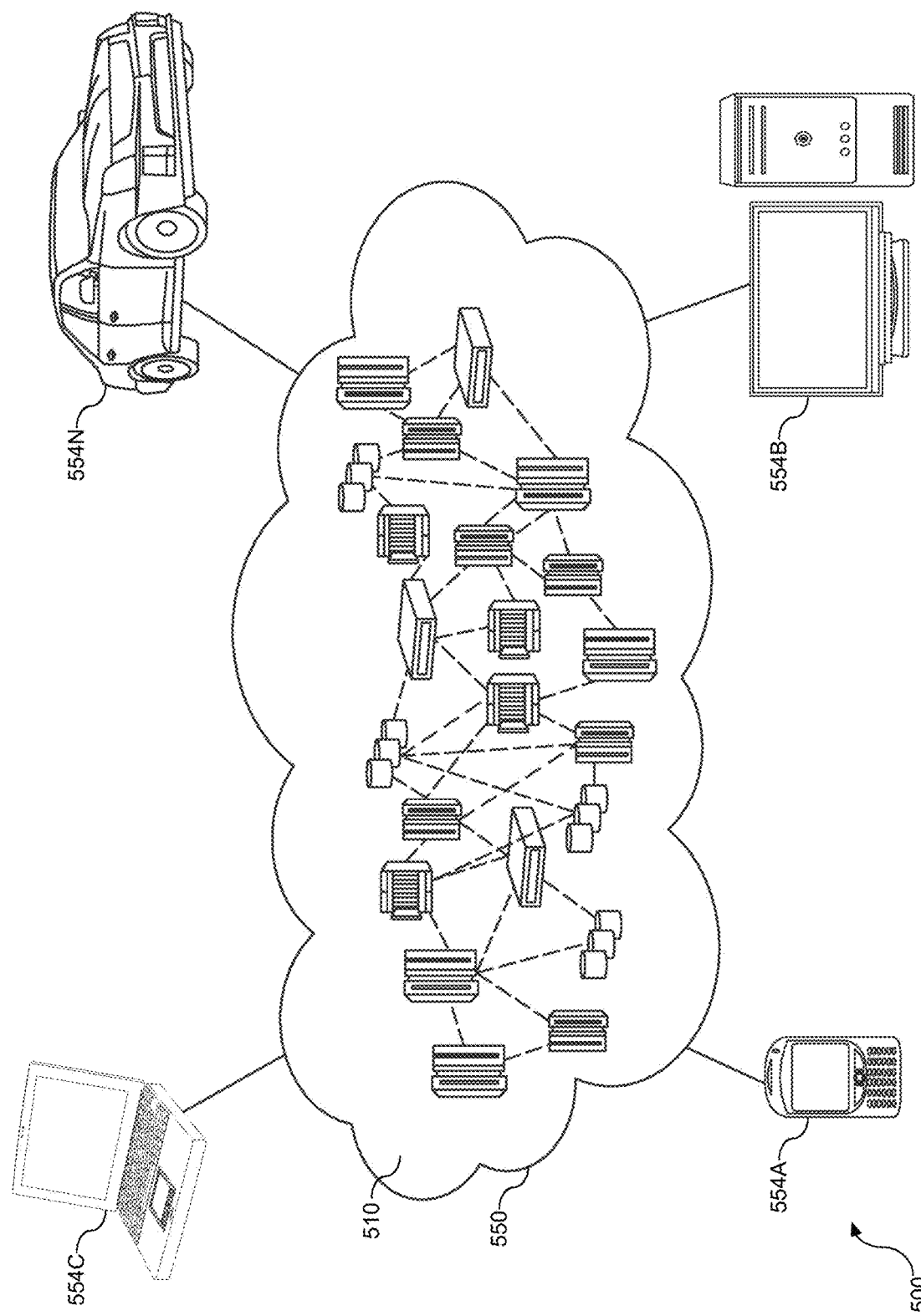
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
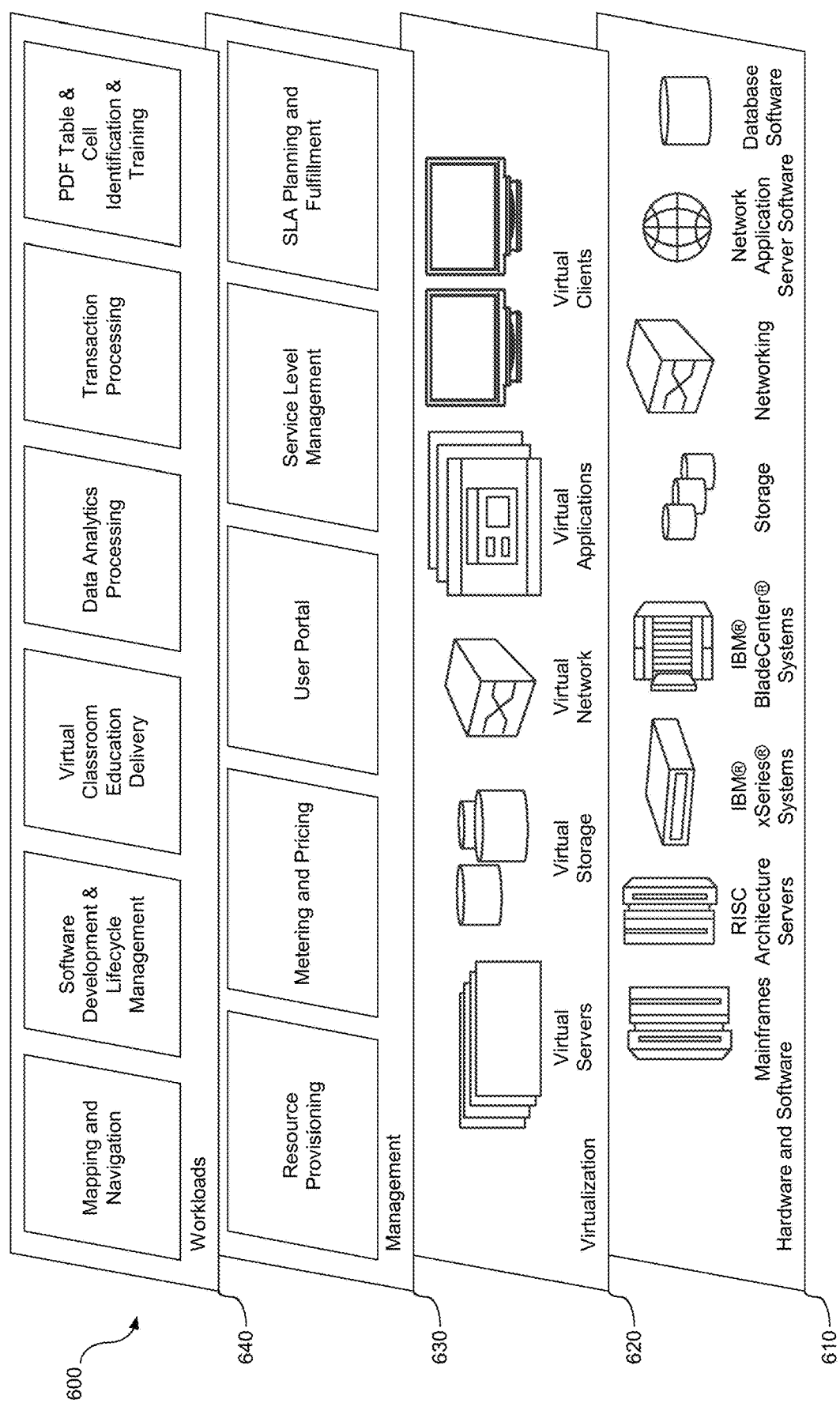
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and PDF table and cell identification and training.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to provide improvements to transfer learning operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additional blocks not represented in the Figures may be included, for example, prior to, subsequent to, or concurrently with one or more illustrated blocks. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
   a processor operatively coupled to memory;
   an artificial intelligence (AI) platform, in communication with the processor, having one or more machine learning (ML) tools, the tools comprising:
   a document manager configured to cause an artificial neural network (ANN) to subject a document collection to table region identification within one or more discretized contiguous areas;
   a cluster manager configured to subject the document collection to clustering, including:
   leverage the ANN to extract one or more structures and location of the one or more structures in the document collection; and
   assign documents within the document collection to one or more clusters responsive to the leveraged ANN, wherein each cluster includes one or more documents having a content characteristic;
   an evaluator configured to selectively evaluate a selection of documents from the one or more clusters, and apply one or more label corrections to the ANN; and
   the ANN configured to generate an update to the document collection incorporating the applied one or more label corrections.

2. The computer system of claim 1, wherein the clustering is based on content comprising visual or textual, or a combination thereof.

3. The computer system of claim 2, wherein the one or more documents in each cluster have at least one table utilizing similar visual cues for delineation from proximal document content.

4. The computer system of claim 3, further comprising the ANN to assign weights to features derived from the visual or textual content, and the cluster manager to leverage the assigned weights for the document collection clustering.

5. The computer system of claim 1, wherein the application of the one or more label corrections and generation of the updated document collection comprises the document manager to conduct at least one of dynamically produce structure given a table boundary update, intelligently split one or more cells along a text line and cell bounding box of a neighboring cell, and dynamically apply a character correction to one or more similar characters.

6. The computer system of claim 1, further comprising:
   the ANN configured to generate output, the output including data representing an interpretation of the extracted one or more structures and location; and
   the cluster manager to leverage the generated output data, including order documents for intra-cluster and inter-cluster evaluation responsive to the generated output data.

7. The computer system of claim 6, further comprising the evaluator to select a collection of documents for evaluation responsive to the document order the selection including at least one of high-confidence and low-confidence document classifications, and inter-cluster classifications.

8. A computer program product to utilize machine learning to facilitate document processing, the computer program product comprising:
   a tangible computer readable storage medium having program code embedded therewith, the program code executable by a processor to:
   cause an artificial neural network (ANN) to subject a document collection to table region identification within one or more discretized contiguous areas;
   subject the document collection to clustering, including:
   leverage the ANN to extract one or more structures and location of the one or more structures in the document collection; and
   assign the documents within the document collection to one or more clusters responsive to the leveraged ANN, wherein each cluster includes one or more documents having a content characteristic;
   selectively evaluate a selection of documents from the one or more clusters, and apply one or more label corrections from the evaluation to the ANN; and
   the ANN configured to generate an update to the document collection incorporating the applied one or more label corrections.

9. The computer program product of claim 8, wherein the clustering is based on content comprising visual or textual, or a combination thereof.

10. The computer program product of claim 9, wherein the one or more documents in each cluster have at least one table utilizing similar visual cues for delineation from proximal document content.

11. The computer program product of claim 10, further comprising the ANN to assign weights to features derived from the visual or textual content, and program code to leverage the assigned weights for the document collection clustering.

12. The computer program product of claim 8, wherein the application of the one or more label corrections and generation of the updated document collection comprises program code to conduct at least one of dynamically produce structure given a table boundary update, intelligently split one or more cells along a text line and cell bounding box of a neighboring cell, and dynamically apply a character correction to one or more similar characters.

13. The computer program product of claim 8, further comprising:
the ANN configured to generate output, the output including data representing an interpretation of the extracted one or more structures and location; and
program code configured to leverage the generated output data, including order documents for intra-cluster and inter-cluster evaluation responsive to the generated output data.

14. The computer program product of claim 13, further comprising program code configured to select a collection of documents for evaluation responsive to the document order, the selection including at least one of high-confidence and low-confidence document classifications, and inter-cluster classifications.

15. A computer-implemented method comprising:
causing an artificial neural network (ANN) to subject a document collection to table region identification within one or more discretized contiguous areas;
subjecting the document collection to clustering, including:
leveraging the ANN to extract one or more structures and location of the one or more structures in the document collection; and
assigning the documents within the document collection to one or more clusters responsive to the leveraged ANN, wherein each cluster includes one or more documents having a content characteristic;
selectively evaluating a selection of documents from the one or more clusters, and applying one or more label corrections to the ANN; and
the ANN generating an update to the document collection incorporating the applied one or more label corrections.

16. The computer-implemented method of claim 15, wherein the one or more documents in each cluster have at least one table utilizing similar visual cues for delineation from proximal document content.

17. The computer-implemented method of claim 16, further comprising the ANN assigning weights to features derived from the visual or textual content, and leveraging the assigned weights for the document collection clustering.

18. The computer-implemented method of claim 15, wherein the application of the one or more label corrections and generation of the updated document collection comprises at least one of dynamically producing structure given a table boundary update, intelligently splitting one or more cells along a text line and cell bounding box of a neighboring cell, and dynamically applying a character correction to one or more similar characters.

19. The computer-implemented method of claim 15, further comprising:
the ANN generating output data representing an interpretation of the extracted one or more structures and location; and
leveraging the generated output data, including ordering documents for intra-cluster and inter-cluster evaluation responsive to the generated output data.

20. The computer-implemented method of claim 19, further comprising selecting a collection of documents for evaluation responsive to the document ordering, the selecting including at least one of high-confidence and low-confidence document classifications, and inter-cluster classifications.

* * * * *